Jan. 7, 1958   C. O. FINN   2,818,682
METHOD OF AND APPARATUS FOR SPREADING COMMINUTED
MATERIAL SUCH AS TOP SOIL AND TOP SOIL
CONTAINING SEED AND/OR FERTILIZER
Filed March 17, 1954
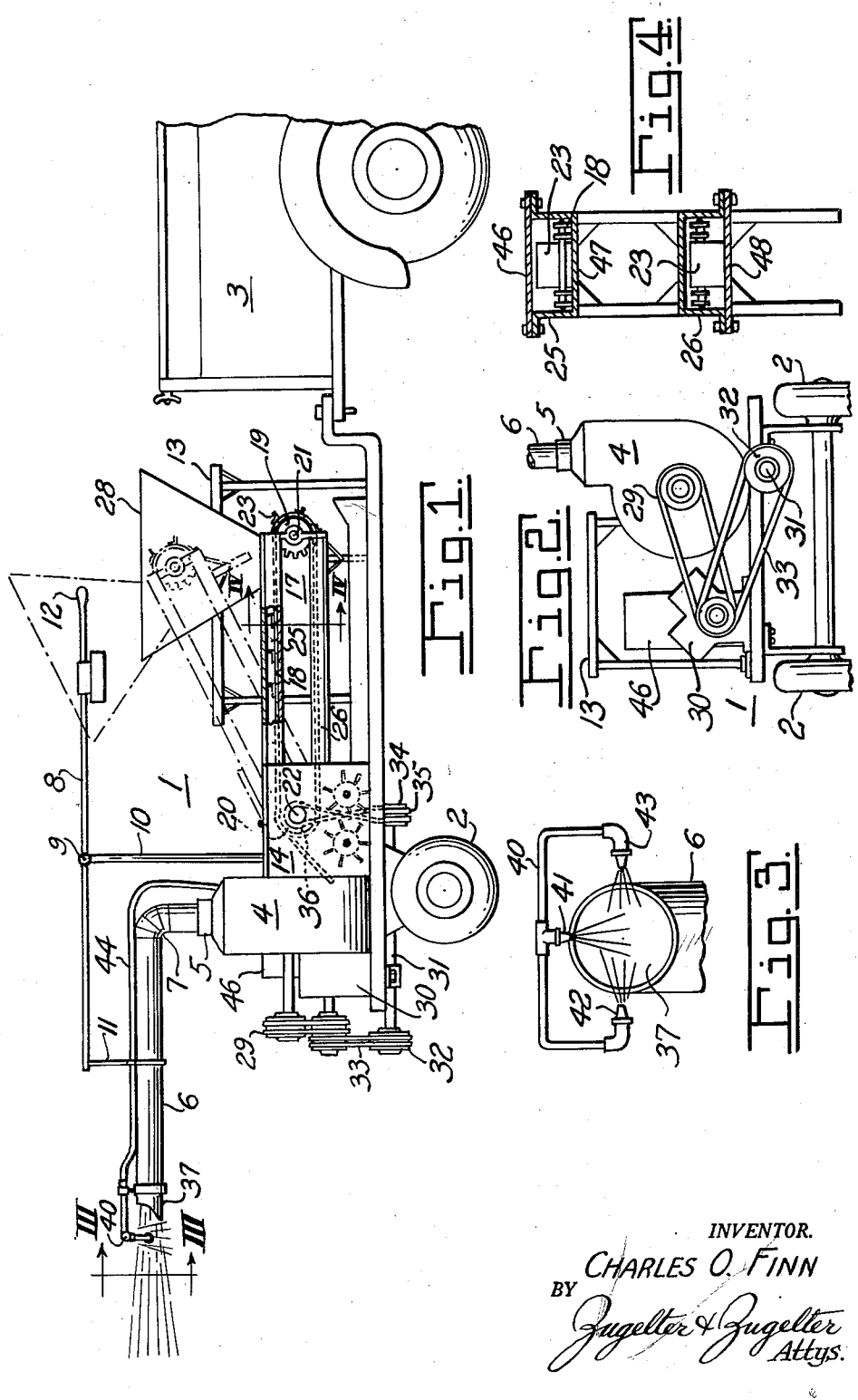
INVENTOR.
CHARLES O. FINN
BY
Zugelter & Zugelter
Attys.

United States Patent Office 2,818,682
Patented Jan. 7, 1958

2,818,682

METHOD OF AND APPARATUS FOR SPREADING COMMINUTED MATERIAL SUCH AS TOP SOIL AND TOP SOIL CONTAINING SEED AND/OR FERTILIZER

Charles O. Finn, Cincinnati, Ohio, assignor to The Finn Equipment Company, Cincinnati, Ohio, a corporation of Ohio Application March 17, 1954, Serial No. 416,812

5 Claims. (Cl. 47—58)

This invention relates to a method of and apparatus for replenishing bare ground with top soil, with top soil and seed, or with top soil, seed and fertilizer.

Modern road-building operations result in barren banks and areas on either or both sides of the road. Heretofore, it has been difficult and costly to induce sufficient growth of grass and vegetation on these barren areas, to protect them against erosion by wind and rain.

It is an object of this invention to provide a method whereby barren ground areas and banks along roadsides may be replenished with fertile soil, or with fertilized soil and seed, at a much higher rate of area coverage per man day, and at a much lower cost per unit of area covered.

Another object of the invention is to provide a method whereby barren ground areas are, so to speak, sprayed with top soil, or top soil containing seed, or top soil containing seed and fertilizer, in a vehicle of air over the barren areas, and whereby the soil, or soil and seed, or soil, seed and fertilizer may be wetted with water to such extent that dust is laid and the soil, the soil and fertilizer, or the soil, fertilizer and seed, as the case may be, are caused to stick and adhere to the areas covered.

A still further object of the invention is to provide apparatus whereby the foregoing method may be performed, the apparatus being propelled along the areas to be replenished, so that the areas may be continuously covered with the soil, the soil and seed, or the soil and seed and fertilizer, as the case may be.

Other objects of the invention will be apparent to those of ordinary skill in the art to which the invention pertains, from the following description taken in conjunction with the accompanying drawing.

In the drawing:

Figure 1 is a view in side elevation of apparatus arranged and constructed in accordance with an embodiment of the invention, and by means of which the method of the invention may be practiced;

Fig. 2 is a rear-end view of the apparatus shown in Fig. 1;

Fig. 3 is a view of a portion of the apparatus, as seen looking in the direction of arrows III—III of Fig. 1; and Fig. 4 is a view in section, taken on line IV—IV of Fig. 1.

In Fig. 1 of the drawing is illustrated a machine 1 mounted on wheels 2, and which may be coupled to the rear of a truck 3 and transported along roadways or barren soil areas to be replenished with top soil, top soil and seed, or top soil, seed and fertilizer, as the case may be. The machine 1 includes a blower 4 having an outlet 5, that is provided with a discharge pipe 6. Pipe 6 is connected to the outlet 5 by means of a swivel elbow joint 7. The pipe 6 may be rotated about the axis of the outlet 5, or raised and lowered while being rotated, by means of a lever 8, pivotally mounted on a fulcrum 9 and supported by a rod or stand 10. One end of lever 8 is connected by a link 11 to the pipe 6, as shown. The other end of the lever 8 is provided with a handle 12, by means of which an operator, standing on a platform 13, may swing the discharge pipe 6 around, and at the same time raise or lower the same, as required.

A housing or duct 14 is connected to the inlet of the blower 4, to provide for admitting top soil, or a mixture of top soil and seed, or a mixture of top soil, seed and fertilizer into the suction of the fan or blower. Top soil, or a mixture of top soil and seed, or a mixture of top soil, seed and fertilizer, is delivered to the suction of the fan into the duct or housing 4, by means of a conveyor 17.

Conveyor 17, as illustrated, comprises an endless chain 18 operating over sprocket wheels 19 and 20, and journaled on shafts 21 and 22, respectively, that are supported by the framework of the conveyor, as shown. The chain 18 is provided, at spaced points, with pusher blades 23 that carry the top soil, or the top soil, seed and fertilizer, as the case may be, to the intake of the fan. The top and bottom reaches of the chain conveyor operate in closed housings 25 and 26 which confine the material carried by the conveyor, and prevent it from falling out of the same.

The comminuted top soil, or a mixture of comminuted top soil and seed, or a mixture of comminuted top soil, seed and fertilizer, is supplied to the conveyor by a hopper 28, mounted to discharge into the top reach of the conveyor at a point adjacent the sprocket wheel 19.

The blower may be driven through a belt 29 by a prime mover, such as an internal combustion engine 30, mounted at the rear of the machine 1. The motor 30 may also be utilized to drive the conveyor chain. For this purpose a shaft 31 is provided, on which is a sheave or pulley 32 coupled to the motor sheave or pulley by a belt 33. The shaft, as shown, extends rearwardly to a point under shaft 22. Shaft 31 is provided with a sheave or pulley 34, that is coupled by a belt 35 to a sheave or pulley 36 on shaft 22.

The top soil, or a mixture of top soil and seed, or a mixture of top soil, seed and fertilizer, may be shoveled by workmen from the truck 3 into the hopper 28. As the truck propels machine 1 along the areas to be covered, the conveyor propels the mixture into the intake of the fan, where it is gathered into the swiftly moving air as a vehicle, delivered through duct 6 and discharged at the outlet 37.

In order to lay the dust of the soil and to insure that it will adhere to the barren soil to be covered, means are provided for wetting the soil, the seed and the fertilizer as it leaves the outlet 37. The means indicated comprises a header 40 having discharge nozzles 41, 42 and 43, spaced as shown, so as to insure sufficient and adequate wetting of the top soil and the other components thereof. As the soil and its components are wetted, the dust is laid and sufficient moisture is added to the soil and the other components, if any, to insure that the soil will stick to the barren ground areas upon which it is directed, thereby preventing it from being blown away by the wind.

The header 40 may be supplied through a supply pipe 44. The supply pipe 44 is connected to a water supply tank 46, and the water is pumped through pipe 44 to the nozzles by means of a pump, not shown.

As shown in Fig. 1, the conveyor 17 and the hopper 28 may be raised or lowered about the shaft 22 as a pivot. When the hopper is in the full-line position, the machine 1 may be used to spread top soil, or top soil enriched with fertilizer and containing seed.

When the conveyor and the hopper 28 are raised to the broken-line position shown in Fig. 1, the machine may be used to lay fibre mats over the areas which have been seeded and top soiled, and the mats caused to stick by means of an adhesive, as disclosed in my copending application, Serial No. 373,563, filed August 11, 1953.

As shown in Fig. 4, housings 25 and 26, for the upper and lower reaches of the conveyor chains, may be formed of metal or other material. The upper housing 25 consists of a member of U-shape in section, with side flanges to which a cover 46 may be bolted. The bottom 47 may, if desired, be provided with a wood liner or made of wood to minimize the rate of wear by the chain sliding over it. The cover 46 is removable so that the chain may be inspected or lodged soil removed.

The bottom housing 26 is substantially the inverse of the upper housing. The member of inverted U-shape is placed on top of a bottom plate 48 and bolted at the flanges, as shown.

In accordance with the foregoing, it will be apparent that the method of the invention consists in applying finely-comminuted soil, or a mixture of finely-comminuted soil and seed, or soil, seed and fertilizer into a swiftly moving, confined stream of air as a vehicle, and then directing that vehicle containing the comminuted particles upon ground areas to be covered. The method includes, also, the wetting of the soil, or soil, seed and fertilizer as it is directed into the air over the ground areas, to prevent its blowing away as dust and to insure that it will stick to the areas to be covered.

To further insure that the top soil, and the top soil or seed and fertilizer, as the case may be, will be retained in place for a time sufficient to allow the seed to sprout and grow, the soil so laid on the barren areas may be covered with a fibre mat, as disclosed in my aforesaid copending application.

Having thus described the invention, it will be apparent to those skilled in this art that various modifications and changes may be made in the illustrated embodiments, without departing from either the spirit or the scope of the invention.

Therefore, what is claimed as new and desired to be secured by Letters Patent is:

1. In a method of spreading a mixture of top soil, seed and fertilizer, that consists in developing a confined stream of swiftly moving air as a vehicle, introducing a mixture of comminuted top soil, seed and fertilizer into said stream, directing said mixture, while suspended in the air stream, over the ground with a sweeping motion and, while so suspended, spraying water into the same, thereby to settle dust and cause the mixture to lie on the ground surface upon which it is directed.

2. In a method of spreading top soil and seeding the same on ground areas, that consists in providing a duct having a discharge, passing swiftly moving air through the duct, introducing a mixture of finely-comminuted soil and seed, into said duct, to be carried by the air stream as a vehicle and discharged from the duct on ground areas to be covermed, and spraying water into the air stream laden with soil and seed as the same leaves the duct, to thereby settle dust and cause the soil and seed to lie on the surface upon which it is directed.

3. A method of replenishing barren ground with top soil and, at the same time, seeding and fertilizing the soil, that consists in intimately mixing finely-divided top soil, fertilizer and seed, providing a confined, swiftly moving vehicle of air, introducing said mixture of soil, seed and fertilizer into said confined stream of air, directing said stream into the atmosphere over the areas to be replenished and seeded and, at the point of release into the atmosphere, injecting moisture into the stream containing said soil, fertilizer and seed, in amounts sufficient to wet the soil, seed and fertilizer and cause the same to stick as a coating on the ground upon which it is directed.

4. Apparatus for spreading comminuted top soil including therewith seed and fertilizer and also for laying down a mulch of fibres on soil areas that comprises a vehicle having thereon a blower, a beater adjacent the inlet of the blower for shredding bales of fibrous material delivered thereto, a platform along which bales of said fibres may be moved to the beater, a discharge pipe connected to the outlet of the blower, said pipe being provided with a swiveled joint whereby the pipe may be turned to give direction to the discharge thereof, a conveyor disposed above said platform and having its discharge end above the beater for conveying comminuted soil and mixtures of soil, seed and fertilizer to the intake of the blower, said conveyor having a hinge at its discharge end whereby it may be raised or lowered to a position in which comminuted material or bales of fibrous material may be selectively fed to the blower, power means on the vehicle for driving the conveyor and blower, means at the outlet of the duct for spraying water into the materials carried by the air stream discharging from said discharge pipe as the materials leave the same to thereby moisten the soil and its components to cause the same to settle and stick on the areas covered thereby, said means at the outlet of the duct also being provided with means whereby an adhesive may be sprayed into the air stream to cause the particles of fibres to be spotted together and form a mat on the soil.

5. Apparatus according to claim 4, in which a hopper is provided for feeding top soil to the conveyor.

References Cited in the file of this patent

UNITED STATES PATENTS

| | | |
|---|---|---|
| 1,118,286 | Johnson | Nov. 24, 1914 |
| 1,670,133 | Bernert | May 15, 1928 |
| 1,766,667 | Miller | June 24, 1930 |
| 1,797,112 | Welsh et al. | Mar. 17, 1931 |
| 1,800,003 | Allstott | Apr. 7, 1931 |
| 1,882,377 | Whittelsey | Oct. 11, 1932 |
| 2,353,836 | Lindig | July 18, 1944 |

FOREIGN PATENTS

| | | |
|---|---|---|
| 278,858 | Switzerland | Feb. 16, 1952 |

OTHER REFERENCES

Consumer Reports, vol. 16, No. 9, pages 414–415 (September 1951), article "The September Gardener."